United States Patent Office 3,078,712
Patented Feb. 26, 1963

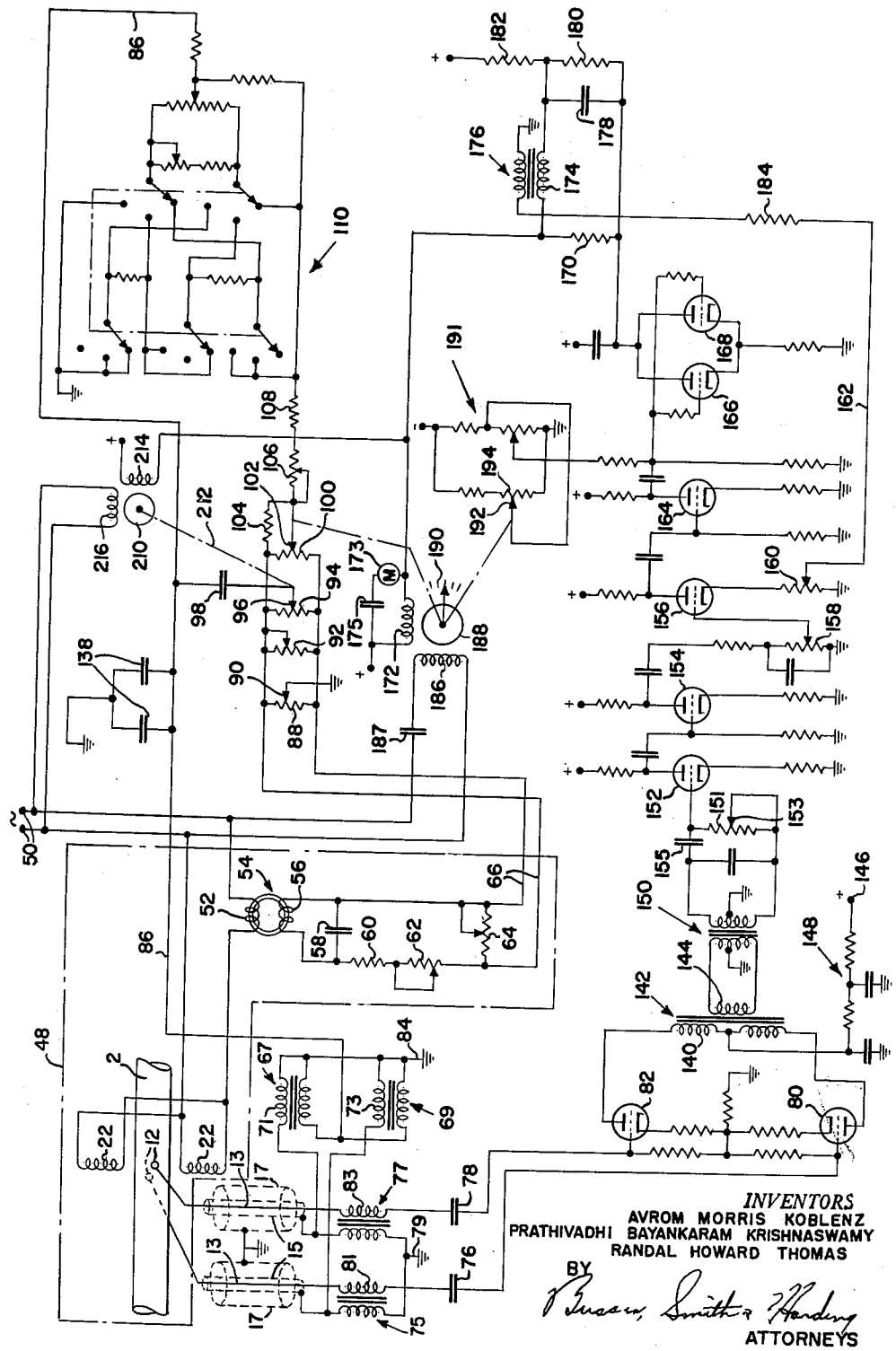

3,078,712
MAGNETIC FLOWMETER
Avrom Morris Koblenz, Philadelphia, Prathivadhi Bayankaram Krishnaswamy, Hatboro, and Randal Howard Thomas, Philadelphia, Pa., assignors to Fischer & Porter Company, Hatboro, Pa., a corporation of Pennsylvania
Filed Apr. 14, 1959, Ser. No. 806,289
6 Claims. (Cl. 73—194)

This invention relates to magnetic flowmeters of the type in which a potential induced in a fluid flowing through a magnetic field is utilized as a measure of quantity of flow.

As is well known, the current or potential outputs produced in a flowmeter of the magnetic type are very small for ordinary flows to be measured and strong magnetic fields are required with consequent difficulties in elimination of the disturbing effects of "noise." Problems of the types encountered have been attacked in various ways, and a highly effective solution has been found by utilizing constructions and circuitry as disclosed in the prior applications of Sholom Kass, Serial Nos. 768,595 and 768,762 and of Victor P. Head, Serial Nos. 768,596, now Patent No. 3,005,342, and 768,701, all filed October 21, 1958. The arrangements disclosed in these applications are the same, but various different aspects are claimed therein.

Magnetic flowmeters provided in accordance with said applications have been found highly satisfactory so long as the conductivity of the fluid undergoing measurement is above about 20 micromhos per centimeter. With fluids having less conductivity measurement errors result due to phase shifts originating from distributed capacity and it is the general object of the present invention to extend the range of accurate measurement to fluids of conductivities much less than 20 micromhos per centimeter. In accordance with the present invention, fluids may be measured having conductivities as low as 0.1 to 0.01 micromho per centimeter, depending upon lengths of cables which are used for signal transmission. While heretofore magnetic flowmeters have been practically useful only for liquid flows, the extension of range to very low conductivities renders them also useful for gaseous fluids such as steam. While, as will appear hereafter, the invention is applicable to other magnetic flowmeter arrangements than that disclosed in the aforementioned applications, the invention will be particularly described with reference to the circuitry of said applications.

The problem which arises in the case of measurement of high resistance fluids may be best appreciated by considering the equivalent circuit of a magnetic flowmeter signal source. This equivalent circuit is basically that of a source voltage feeding a series circuit consisting of a high resistance and a capictance, with the output signal taken across the capacitance. The high resistance involved is that presented by the fluid. The capacitance is that presented by the distributed capacity of a connecting cable arrangement together with the effectively parallel capacitances introduced in transformer windings. As will be evident, if the reactance of the effective capacitance is of the order of the high resistance there is not only a substantial phase shift of the derived signal with respect to the voltage to be measured generated between the electrodes, but there is also a variable attenuation of in-phase component of the signal depending upon variations in both the resistance and capacitance. Furthermore, residual quadrature signals not practically removable by shielding give rise, by phase shift, to in-phase components not distinguishable from the signals originating from fluid flow.

If the resistance and capacitance could be considered even approximately constant throughout a range of operation, the solution to the problem might not be so difficult; but, particularly in the case of very high resistance liquids there is involved a very large error due to temperature changes, it being not unusual for the conductivity of a high resistance liquid to vary by as much as a 1 to 5 ratio in the temperature range from 20° C. to 80° C. Furthermore, in most installations it is desirable to have the electrodes connected through cables of substantial lengths to the first elements of the circuit which would serve to terminate, effectively, the shunt capacitance. Cables of desired lengths not only introduce substantial capacitance, and therefore comparatively low reactance in comparison with the effective high series resistance, but the capacitance is also variable with temperature and configuration changes. In accordance with the most desirable type of circuit used, i.e., that of the applications referred to above, the output signal from the electrodes is automatically balanced to provide an error signal which is used to control the automatic rebalancing. This error signal is typically of the order of 1% of the signal produced at the electrodes. However, the quadrature components which are unbalanced and which have their origin in the phase shift above indicated and in stray pickups may be many times larger than the error signal and the attenuation of the in-phase component may also have a magnitude considerably exceeding the error signal. Furthermore, original quadrature signals give rise to in-phase components and measurements dependent upon balancing of in-phase signals thus do not truly reflect flow. While the circuit arrangement of said applications is designed to take care of quadrature signals due to stray pickups and phase shifts in other portions of the apparatus, the quadrature signals arising from the high resistivities of liquids are not compensated (and remain present to overload amplifiers), and it is particularly the compensation of the latter to which the present invention is primarily directed, the invention also being directed to prevention of phase shifts of quadrature signals giving rise to spurious in-phase signals.

In brief, in accordance with the invention, the cable conductors connecting the electrodes with a rebalancing transformer arrangement have shields which are driven to substantial equality of potentials in both phase and magnitude with the potentials of the conductors. To the extent that this end is accomplished no capacity is presented to the conductors with the result that the detrimental phase shifs of both in-phase and quadrature signals are eliminated. This end is accomplished through the use of two reversible motors in the circuit, one of them responsive to an in-phase component of an output signal and the other responsive to the quadrature component, to drive the shields to approximate equality of potentials with the potentials of the conductors, and to rebalance the in-phase component.

The attainment of the objectives of the invention may be best made clear by reference to the drawing, the figure of which shows a wiring diagram providing control in accordance with the invention.

The circuit which is illustrated is, to a considerable extent, similar to that of the foregoing applications, and for simplifying comparison reference numerals in the figure are applied to elements corresponding to those used in said applications for corresponding elements.

The meter comprises a tube 2 which typically may be of stainless steel provided with an insulated liner. At diametrically opposite points the tube 2 is provided with pickup electrodes 12 insulated from the tube but making conductive contact with the fluid flowing therethrough. A magnetic field of uniform type is provided which extends at right angles to the diameter forming the common axis of the electrodes 12 and to the tube axis, this field being provided by a pair of coils 22 of identical shape. Since the present invention is not concerned directly with the details of what has been so far discussed, these details are not illustrated, but the arrangements of the electrodes of the magnetic field producing means are desirably as shown and described in the applications referred to above.

The flowmeter comprises two units which may be conveniently referred to as primary and secondary units. The primary unit encompasses the elements which are located within the boundary 48, this unit including the tube 2, the electrodes 12 and the coils 22. Those elements which are outside the boundary 48 constitute the secondary unit. As described in said applications, this division of the flowmeter into two units is convenient inasmuch as the secondary unit may be standard for flowmeters of a large range of flow capacity, while the primary units may be made different for the measurements of different flow ranges. All of the primary units are arranged to match the standardized secondary unit to afford interchangeability.

Alternating current is supplied from the terminals 50 connected to the usual power supply, for example, 110 volts at 60 cycles. The wiring diagram also shows various direct current supply terminals and it will be understood that these are fed by conventional direct power supplies energized from the commercial alternating power supply.

The magnetic field windings 22 are connected in parallel and to the supply terminals 50, there being in series with the field windings the primary winding 52 of a toroidal transformer 54 the secondary winding 56 of which is connected to a network comprising the capacitor 58 connected across the secondary and the parallel resistance arrangement comprising in series the fixed and adjustable resistors 60 and 62 and the adjustable resistor 64, to the terminals of the latter there being connected the leads 66 to the secondary unit. The transformer 54 and the network provide the impedance match to the secondary unit. By the use of the network described, the output of the secondary of the toroidal current transformer 54 is adjusted to provide a feedback potential 180° out of phase with the signal potential which appears at the electrodes 12, it being noted that the primary of this current transformer is directly in series with the windings 22 and carries the current in these windings. While the elements of the network are interdependent, the adjustment of resistor 62 primarily affords phase adjustment while that of resistor 64 affords amplitude adjustment. These provide corrections for eddy current shifts of the flow signal with respect to the magnet coil current. The result of the adjustments is to provide a constant ratio between the potential per unit velocity appearing at the electrodes and the current which is provided at the conductors 66. The ultimate result is that the response of the secondary unit is full scale in terms of feet per second of liquid flow velocity for any primary unit which may be associated with a secondary unit, the transformer 54 having a turn ratio consistent with the securing of this result.

Extending from the electrodes 12 are cables providing connections between the units, which cables are primarily responsible for the phase shifts causing troubles. The cables are indicated as comprising insulated conductors 13 surrounded by concentric shields 15 which are insulated and which are in turn surrounded by grounded shields 17. The shields 17 may be constituted by a single shield. The cables thus provided may be of considerable length depending upon the physical arrangement of the apparatus which is desired. A pair of transformers 75 and 77, each of approximately 1:1 ratio have their respective primaries connected between ground at 79 and the shields 15. The secondaries 81 and 83 of these transformers are connected in series with equal capacitors 76 and 78 between the respective lines 13 and the grids of triodes 80 and 82 of a preamplifier. A pair of transformers 67 and 69 have their primaries in parallel between a line 86 and ground at 84 and are arranged to provide balancing of the electrode signals. The two secondaries 71 and 73 of these transformers are connected between ground and the ungrounded ends of the primaries of transformers 75 and 77. The ratios of the transformers 67 and 69 are the same but may be other than unity depending upon other circuit constants. Polarities of windings are arranged so that the signal provided to each shield is approximately the same in both magnitude and phase as that appearing at the respective enclosed conductor 13. The connections are also such that opposition to the electrode potential is provided by each transformer. The symmetrical transformer arrangements provide rejection of longitudinal signals which may flow in the same direction through the symmetrical connections.

While an approximately 1:1 ratio for each of transformers 75 and 77 is used, a slight deviation from this ratio is desirable for the following reasons:

The transformers 75 and 77 present small capacitances to the lines 13. If the shields are driven to potential exceeding those of the lines 13, the effect is that of introducing negative capacitances between the lines and their shields in parallel with the positive capacitances due to the transformers. Thus, if the drive is proper, a zero effective capacitance is secured. Desirably, therefore, the transformers have a slight step-down ratio (e.g., in a typical case 1.02:1) to attain this result, the ratio being chosen in accordance with measurement of the capacitance to be balanced out.

The feedback signal in connection 86 is derived from a network receiving its input from the lines 66. A potentiometer 88 connected between these lines has its adjustable contact 90 grounded. A second potentiometer 92 is connected between these lines to provide a variable resistance. A third potentiometer 94 connected between these lines has its adjustable contact 96 connected through capacitor 98 to the connection 86. A fourth potentiometer 100 connected between the lines 66 is arranged as illustrated with its variable contact 102 connected to one of the lines through a resistor 104 and through a variable resistor 106 and a fixed resistor 108 to the range adjustment network generally indicated at 110. The arrangement just described is similar to what is shown in the applications referred to above with the exception that instead of being manually adjustable the contact 96 is automatically driven by a motor as described below.

The range adjustment network 110 plays no special part in the matter of the present invention and is therefore not described in detail. It may be regarded as merely providing variable attenuation between the resistor 108 and the line 86.

The functions of the various parts of the network just described are as follows:

The potentiometer 88 serves as an electrical centering control to set zero flow at any desired position on the recording chart of the meter. This makes it possible to indicate and measure bidirectional flow where that is required. The nature of this action will be evident upon considering the ground connections of contact 90 and, at 84, the ground connection of the primaries of transformers 69 and 67.

The adjustable resistance at 92 is to set the input resistance of the balancing network. This input resistance is desirably of low value, typically, for example, about 81 ohms, and by the use of the adjustment under discussion the input resistance may be set to such a value that various secondary units may be made interchangeable.

The potentiometer 94 and its connection through capacitor 98 provides for the nulling out of signals which are in quadrature with the error signal. The proper phase of quadrature signal is obtained by use of the capacitor 98 the reactance of which is many times that of the reactance across transformers 69 and 67. A phase shift obtained from this capacitor is very nearly 90° and this shift gives essentially a true quadrature signal across transformers 67 and 69.

Balancing of in-phase signals is effected by the motor controlled movements of the contact 102 of potentiometer 100 which is associated with the fixed resistor 104 which compensates for the load on the potentiometer 100 caused by the range of adjustment network, and with the adjustable resistance 106 which compensates for the loading of the range network by the input impedance of the balanced transformers 67 and 69.

The balanced signal from the last mentioned elements is fed and attenuated through the range adjusting network 110 so that full scale sensitivity is accurately known.

The inductive reactance of the balancing transformers causes a phase shift of the balancing signal which must be corrected, and while automatic correction is obtained as later described, there may be desirably used for an original balancing adjustment capacitors 138 connected between line 86 and ground chosen to suit particular units. Through the use of standard capacitors, one being relatively large and the other being small to act as a trimmer, it is unnecessary to provide for this particular phase correction an adjustable capacitor.

If it were assumed that there was an indicator of the potential difference between the grids of triodes 80 and 82, and if adjustment of the contact 102 of potentiometer 100 was made to provide a zero in-phase potential difference at these grids, it will be evident that the setting of the potentiometer contact would be a measure of the liquid flow.

The foregoing would be rue if there was no attenuation of in-phase signal due to shunting capacitance of the leads 13. Automatic adjustment to secure a null is achieved as will now be described.

The triodes 80 and 82 and their associated circuitry provide a preamplifier for the net output from the secondaries of transformers 75 and 77 and the electrodes 12.

The preamplifier provides primarily an impedance matching device and transformation from a balance-to-unbalance arrangement and provides longitudinal signal rejection. The triodes are connected in push-pull arrangement to the primary windings 140 of a transformer 142, the secondary 144 of which feeds through a transformer 150 amplified signals to the first stage triode 152 of the main amplifier. Desirably special filtering is provided at 148 for the positive supply provided to the triodes 80 and 82 from a positive supply terminal 146 of the power supply. The main amplifier involves the triodes 152, 154, 156 and 164 in generally conventional form with phase shift adjustment by variation of contact 153 of potentiometer 151, providing a variable resistance associated with capacitor 155, and with grain control provided at potentiometer 158. In order to avoid hum it is desirable to provide to the heaters of triodes 80, 82, 152 and 154 suitable direct current which may be derived from the supply through a suitable rectifier and simple filter system, not shown. Rate feedback control is provided at the potentiometer 160 in the cathode-to-ground return of triode 156.

In order to provide sufficient motor driving power, a pair of triodes 166 and 168 provide a power amplifier by arangement in parallel. Their output is provided through resistor 170 to the field winding 172 of the motor 188. The other phase winding 186 of this motor is provided with reference current from the terminals 50 through the capacitor 187. It will be understood that the motor is of a type which reverses in accordance with the phase relationship of the currents through its windings 172 and 186, remaining stationary when the current in winding 172 is in quadrature with that properly produced therein by desired signals picked up by electrodes 12. Shunted across the field winding 172 is the series arrangement of an alternating current voltmeter 173 and capacitor 175. The purpose of this arrangement is described in the applications referred to above.

The primary 174 of a transformer 176 is connected between the signal output side of the resistor 170 and the parallel arrangement of resistor 180 and capacitor 178, the right hand end of the transformer primary 174 being connected through resistor 182 to a positive supply terminal which may be the same terminal as that to which the winding 172 is connected. The secondary of the transformer 176 provides a signal between ground and the adjustable contact of the rate adjustment potentiometer 160, the connection being through resistor 184 and lead 162. This rate feedback control has its usual functions.

The circuit arrangement illustrated at 191 is provided to prevent rapid excursions of a recording pen in response to hydraulic "noise" as described in detail in the application of Sholom Kass, Serial No. 768,762, referred to above. Included is a potentiometer 194 having a contact 192 adjusted by motor 188.

While 188 has been generally referred to as a motor, it will be understood that this will generally be a conventional phase-sensitive reversible recorder motor driving through reduction gearing the potentiometer contacts 102 and 192 and either an indicator or a marking pen cooperating with either a fixed or time driven chart scale indicated at 190. In conventional fashion this may also (or solely) operate controls related to the flow, e.g., to maintain the flow constant, to effect other operations in accordance with the flow, or the like.

A reversible motor 210 is connected to drive through a mechanical connection indicated at 212 the adjustable contact 96 of potentiometer 94. One of the phase windings of this motor is indicated at 214 and receives its power input from the same connections as feed the phase winding 172 of motor 188. The other phase winding 216 of the motor 210 is connected directly to the supply terminals 50. It will be noted that the respective windings 186 and 216 receive currents 90° out of phase. In brief, the motor 188 operates in response to error signals which are in phase with the output from the electrodes 12, while the motor 210 operates in response to signals which are in quadrature with those produced at the electrodes 12.

The overall operation of the flowmeter may now be outlined as follows:

For a given rate of flow through the tube 2 there will be produced an output voltage across the electrodes 12 the magnitude of which is proportional to the flow rate for a given magnetic field strength provided by the windings 22. Considering, first, the in-phase component of this signal appearing at the transformer ends of the lines 13, prior to balance corresponding signals are applied to the amplifier system to provide to the motor winding 172 a current which will drive the motor 188 and with it the potentiometer contact 102 to provide a feedback signal to balance the electrode signal to provide a zero in-phase input to the amplifier. Note that in case of a voltage change at terminals 50 effecting the strength of the magnetic field, a corresponding change in output from the transformer 54 occurs so as to balance out effectively such variations.

Concurrently, a similar situation arises in the matter of nulling quadrature signals, the motor 210 being operated by quadrature signal components appearing in winding 214 to adjust the output of quadrature signal which is delivered to the line 86 by reason of the arrangement of potentiometer 94 and capacitor 98.

The two foregoing corrective operations occur simultaneously, and a final condition is achieved in which the shields 15 have substantially the same potentials applied thereto (subject to the minor deviations mentioned above), both in magnitude and phase, by reason of the approximately 1:1 transformers 75 and 77, as the respective conductors 13 therein. When this condition is achieved, there is no effective distributed capacity along the cable conductors 13 and also effectively nulled out are the effects of any capacitances in the transformers 75 and 77. With these capacitances effectively eliminated, phase shifts due to capacitance effects in conjunction with high fluid resistivities are eliminated. The absence of quadrature components means that attenuation is not involved when a null balance is achieved and that the in-phase feedback is equal and opposite to the full in-phase signal delivered at the electrodes 12, in-phase components due to phase shift of quadrature signals being eliminated. Thus, the adjustment of the motor 188 as reflected by the position of an indicator or recorder pen on a dial or chart 190 constitutes a measure of the flow in the pipe 2.

As a result of the foregoing, the operational range of the flowmeter is extended to fluids having low conductivities of the order of 0.01 to 0.1 micromho per centimeter. Furthermore, since a null balance detecting or recording scheme is used the results are independent of the magnitude of the conductivity as this may vary with temperature (or in the case of elastic fluids with pressure), since the resistance involved has significance only when capacitance is involved giving rise to phase shift.

It may be noted that even if the shields 15 are not driven as described, improvements in operation will result due to balancing of quadrature as well as in-phase signals. For best results, however, the shields are driven as indicated.

It will be apparent that feedback to cable shields as described herein might be provided in conjunction with other arrangements for detection and measurement of signals, the objective being in any such case the effective elimination of distributed capacitance and/or of lumped capacitance such as may be provided by transformer windings. It will further be obvious that details of the matters described herein may be modified without departing from the invention which should not be construed as limited except as required by the following claims.

What is claimed is:

1. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including shielded leads connecting said electrodes to the input of said amplifier, a network receiving an input from said alternating current supplying means and providing an output to said amplifier bucking the signals from said electrodes, means controlled by said amplifier to effect adjustment of said network to null the signals delivered from the amplifier, the last mentioned means comprising a pair of devices, one responsive primarily to signal components at the input of said amplifier in phase with the signals picked up by said electrodes, and the other responsive primarily to signal components at the input of said amplifier in quadrature with the signals picked up by said electrodes, for providing respectively in-phase and quadrature nulling signals, and means for automatically driving the shields of said leads approximately to the potentials of said leads.

2. A flowmeter according to claim 1 in which the last mentioned means comprises at least one transformer having its respective windings connected to one of said leads and its shield.

3. A flowmeter according to claim 1 in which the last mentioned means comprises a pair of transformers each of which has its respective windings connected to one of said leads and its shield.

4. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including leads connecting said electrodes to the input of said amplifier, a network receiving an input from said alternating current supplying means and providing an output to said amplifier bucking the signals from said electrodes, and means controlled by said amplifier to effect adjustment of said network to null the signals delivered from the amplifier, the last mentioned means comprising a pair of devices, one responsive primarily to signal components at the input of said amplifier in phase with the signals picked up by said electrodes, and the other responsive primarily to signal components at the input of said amplifier in quadrature with the signals picked up by said electrodes, for providing respectively in-phase and quadrature nulling signals.

5. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including leads connecting said electrodes to the input of said amplifier, a network receiving an input from said alternating current supplying means and providing an output to said amplifier bucking the signals from said electrodes and means controlled by said amplifier to effect adjustment of said network to null the signals delivered from the amplifier, the last mentioned means comprising a pair of devices, one responsive primarily to signal components at the input of said amplifier in phase with the signals picked up by said electrodes, and the other responsive primarily to signal components at the input of said amplifier in quadrature with the signals picked up by said electrodes for providing nulling signals.

6. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including leads connecting said electrodes to the input of said amplifier, shields individually enclosing said leads, a network receiving an input from said alternating current supplying means and providing an output to the input of said amplifier directly bucking the unamplified signals from said electrodes, means controlled by said amplifier to effect adjustment of said network to null the signals delivered from the amplifier, and means for automatically driving the shields of said leads approximately to the potentials of their respective enclosed leads, the last mentioned means comprising an adjustable signal supplying means and means for adjusting the signal supplying means in response to signal components at the input of said amplifier in quadrature with the signals picked up by said electrodes.

References Cited in the file of this patent

UNITED STATES PATENTS

| | | |
|---|---|---|
| 2,696,737 | Mittelmann | Dec. 14, 1954 |
| 2,729,103 | Raynsford et al. | Jan. 3, 1956 |
| 2,733,604 | Coulter | Feb. 7, 1956 |
| 2,757,538 | Soffel | Aug. 7, 1956 |